US012661725B2

(12) United States Patent
Hanamura et al.

(10) Patent No.: US 12,661,725 B2
(45) Date of Patent: Jun. 23, 2026

(54) CUTTING INSERT

(71) Applicant: TUNGALOY CORPORATION, Fukushima (JP)

(72) Inventors: Yosuke Hanamura, Iwaki (JP); Satoru Yoshida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 557 days.

(21) Appl. No.: 18/311,510

(22) Filed: May 3, 2023

(65) Prior Publication Data

US 2023/0381871 A1 Nov. 30, 2023

(30) Foreign Application Priority Data

May 26, 2022 (JP) ................................. 2022-086152

(51) Int. Cl.
 *B23C 5/06* (2006.01)
 *B23C 5/20* (2006.01)
(52) U.S. Cl.
 CPC ................ *B23C 5/06* (2013.01); *B23C 5/202* (2013.01); *B23C 2200/0405* (2013.01); *B23C 2200/281* (2022.02); *B23C 2200/32* (2013.01); *B23C 2200/361* (2013.01); *B23C 2230/04* (2013.01)
(58) Field of Classification Search
 CPC ..... B23C 5/06; B23C 5/202; B23C 2200/208; B23C 2200/0405; B23C 2200/281; B23C 2200/287; B23C 2200/32; B23C 2200/361; B23C 2200/365; B23C 2200/369;

(Continued)

(56) References Cited

U.S. PATENT DOCUMENTS 5,971,672 A 10/1999 Hansson
7,419,338 B2 * 9/2008 Smilovici ............. B23C 5/2213
407/115

(Continued)

FOREIGN PATENT DOCUMENTS

EP 3338926 A1 * 6/2018 ............... B23C 5/06
EP 3542936 A1 * 9/2019 ............... B23C 5/06

(Continued)

*Primary Examiner* — Nicole N Ramos
(74) *Attorney, Agent, or Firm* — Studebaker Brackett PLLC

(57) ABSTRACT

Provided is a cutting insert in which cutting edges in a plurality of sections can be used, and it is possible to keep chips, which are discharged from a cutting edge in a section that is being used, from damaging an unused cutting edge in an adjacent section. An edge where an upper surface and a peripheral side surface intersect is divided into a plurality of sections AB, BC, CD, and so on. In each of the plurality of section, the section AB, for example, includes one minor cutting edge and one major cutting edge that is longer than the minor cutting edge. The major cutting edge is inclined at an angle α to be away from a lower surface gradually while extending away from the minor cutting edge. A height position of the upper surface in an up-down direction in which the upper surface and the lower surface oppose each other does not change as the upper surface extends toward the attachment hole, or the height position decreases in a direction from the upper surface toward the lower surface.

8 Claims, 10 Drawing Sheets

(58) Field of Classification Search
      CPC ........ B23C 2200/0444; B23C 2200/28; B23B
                                                    2200/208
      See application file for complete search history.

(56)                    References Cited

U.S. PATENT DOCUMENTS

| | | | |
|---|---|---|---|
| 2010/0150671 A1* | 6/2010 | Oprasic | B23C 5/202 |
| | | | 407/42 |
| 2012/0070240 A1* | 3/2012 | Ishi | B23C 5/06 |
| | | | 407/42 |
| 2012/0155976 A1* | 6/2012 | Ishi | B23C 5/06 |
| | | | 407/66 |
| 2012/0189396 A1* | 7/2012 | Xu | B23C 5/06 |
| | | | 407/42 |
| 2013/0129430 A1 | 5/2013 | Bhagath et al. | |
| 2014/0199127 A1* | 7/2014 | Imai | B23C 5/202 |
| | | | 407/42 |
| 2014/0212229 A1* | 7/2014 | Diepold | B23C 5/205 |
| | | | 407/42 |
| 2015/0190869 A1 | 7/2015 | Roman et al. | |
| 2017/0189972 A1 | 7/2017 | Matsumura et al. | |
| 2017/0216940 A1 | 8/2017 | Aso | |

FOREIGN PATENT DOCUMENTS

| | | |
|---|---|---|
| JP | H10-507693 A | 7/1998 |
| JP | 2009-202324 A | 9/2009 |
| JP | 2011-121131 A | 6/2011 |
| JP | 2015-128816 A | 7/2015 |
| WO | 2012/043579 A1 | 4/2012 |
| WO | 2015/182562 A1 | 12/2015 |
| WO | 2016/017780 A1 | 2/2016 |

* cited by examiner

1

3

3

3

3

CUTTING INSERT OF PRESENT INVENTION

CUTTING INSERT OF CONVENTIONAL ART

CUTTING INSERT

CROSS-REFERENCES TO RELATED APPLICATIONS

This application relates to and claims priority from Japanese Patent Application No. 2022-086152, filed on May 26, 2022, the entire disclosure of which is incorporated herein by reference.

BACKGROUND

Field

The present invention relates to a cutting insert.

Description of Related Art

In milling tools such as a face milling cutter, increasing the inclination angle of a major cutting edge (hereinafter referred to as an "apparent axial inclination angle") in a side view in a state where a cutting insert is attached to a tool body increases the sharpness. In order to increase the apparent axial inclination angle, it is common for the major cutting edge of a cutting insert for a milling tool to have a shape that extends downward and to the right approaching to the lower surface of the cutting insert while extending away from a minor cutting edge, or to have a shape that is parallel to the lower surface (for example, see Patent Publication JP-A-2015-128816).

If the cutting insert is a single-sided cutting insert and has a side surface that is inclined relative to a central axis of an attachment hole, when the cutting insert is attached to the tool body, the upper surface can be inclined so as to increase the apparent axial inclination angle within the clearance angle of the side surface. In such a cutting insert, there are also cases where the major cutting edge has a shape that extends upward and to the right (for example, see Patent Publication JP-A-2009-202324 and Patent Publication JP-A-2011-121131).

On the other hand, in a double-sided cutting insert, the side surface is parallel to the central axis of the attachment hole, and thus, if the upper surface is inclined relative to the axial direction of the milling tool so as to increase the apparent axial inclination angle, a flank of a minor cutting edge will interfere with cutting-target material. If there is a desire to increase the apparent axial inclination angle, it is rare for the major cutting edge of the double-sided cutting insert to have a shape that extends upward and to the right.

SUMMARY

If the major cutting edge has a shape that extends downward and to the right, chips discharged from the cutting edge in a section that is being used are likely to come into contact with a cutting edge in another right adjacent section (see FIG. 10). If the cutting edge in the right adjacent section is an unused cutting edge instead of a used cutting edge, the chips will damage the unused cutting edge. If a cutting edge is damaged prior to use, the cutting edge cannot be used, and, as such, cost-effectiveness is reduced.

Thus, an object of the present invention is to provide a cutting insert in which cutting edges in a plurality of sections can be used, and it is possible to keep chips, which are discharged from a cutting edge in a section that is being used, from damaging an unused cutting edge in an adjacent section.

A cutting insert including: an upper surface; a lower surface on an opposite side to the upper surface; a peripheral side surface that connects the upper surface and the lower surface to each other; and an attachment hole that extends through the upper surface and the lower surface. The upper surface is rotationally symmetrical about a central axis extending through a center of the upper surface and a center of the lower surface, and the lower surface has substantially the same shape as the upper surface. An edge where the upper surface and the peripheral side surface intersect is divided into a plurality of sections, and each of the sections includes one minor cutting edge and one major cutting edge that is longer than the minor cutting edge. Each of the major cutting edges is inclined to be away from the lower surface gradually while extending away from the minor cutting edge. As the upper surface extends from each of the major cutting edges toward the attachment hole, a height position of the upper surface in an up-down direction, in which the upper surface and the lower surface oppose each other, does not change, or the height position decreases in a direction from the upper surface toward the lower surface.

A cutting insert including: an upper surface; a lower surface on an opposite side to the upper surface; a peripheral side surface that connects the upper surface and the lower surface to each other; and an attachment hole that extends through the upper surface and the lower surface. The upper surface is rotationally symmetrical about a central axis that extends through a center of the upper surface and a center of the lower surface, and the lower surface has substantially the same shape as the upper surface. An edge where the upper surface and the peripheral side surface intersect is divided into a plurality of sections, and each of the sections includes one minor cutting edge and one major cutting edge that is longer than the minor cutting edge. Each of the major cutting edges is inclined to be away from the lower surface gradually while extending away from the minor cutting edge. The upper surface includes a flat surface parallel to a virtual plane perpendicular to a central axis extending through the center of the upper surface and the center of the lower surface, a rake surface that is provided on a periphery of the flat surface and is inclined at a first angle relative to the virtual plane, and a land that is provided between the rake surface and the major cutting edges and is inclined at a second angle relative to the virtual plane, the second angle being smaller than the first angle. For each of the major cutting edges, a reference value is a length of a shortest distance from each of the linear major cutting edges to an outer edge of the attachment hole in a plan view as seen along the central axis. A variable is a distance, along a direction perpendicular to the central axis, from a virtual intersection point, where a virtual straight line that is an extension of a contour of the linearly formed land intersects the flat surface, to the major cutting edge in a cross-section taken perpendicular to the major cutting edge at any position along the major cutting edge, the variable changing depending on the any position at which the cross-section is taken. All of the variables are larger than half of the reference value.

The apparent axial inclination angle is determined by three elements, namely the inclination angle of the major cutting edge as seen from a side surface of a milling tool, a radial rake angle, and a cutting angle. Even if the major cutting edge is inclined upward and to the right in the cutting insert, balance can be achieved by increasing the radial rake angle, which is a negative angle, in the negative direction so that the apparent axial inclination angle is a positive angle. These aspects share configurations in which, in a double-sided cutting insert whose upper surface and lower surface have approximately the same shape, the major cutting edge has a shape that is inclined upward and to the right away from the lower surface gradually while extending away from the minor cutting edge, and the upper surface is shaped so that a gap can be easily secured between the upper surface and the cutting-target material. In the former, even if there is a decrease in the height position, the height position of the upper surface does not increase as the upper surface extends toward the center of the upper surface, and thus the height of the upper surface decreases in a direction toward the center of the upper surface. There is no protrusion on the upper surface, and thus a gap can be easily secured between the upper surface and the cutting-target material. In the latter, variables, which have the property of decreasing when there is a protrusion on the upper surface, are greater than half of the reference value on the low cutting side of the major cutting edge as well as the high cutting side. The protrusions of the upper surface are small, and thus a gap can be easily secured between the cutting-target material and the upper surface. With these aspects, even if the radial rake angle is further increased in the negative direction, the upper surface has a shape where chips are unlikely to be seized between the upper surface and the cutting-target material, and thus employing a major cutting edge that extends upward and to the right makes it possible to keep chips discharged from a cutting edge in a section that is being used from damaging an unused cutting edge in an adjacent section.

In the above aspect, in a plan view as seen from the upper surface, for each of the sections, an angle formed by the minor cutting edge and the major cutting edge is 140° or more and 155° or less.

With this aspect, the cutting angle is 25° or more and 40° or less, which is smaller than a common angle of 45°. Even if the major cutting edge is inclined upward and to the right, balance can be achieved by reducing the cutting angle so that the apparent axial inclination angle is a positive angle.

In the above aspect, for each of the major cutting edges, a second virtual straight line extending in the up-down direction, in which the upper surface and the lower surface oppose each other, through a lowest point, which is a point on the major cutting edge that is closest to the lower surface, and a highest point, which is a point on the major cutting edge that is farthest from the lower surface, is inclined at an angle of 1° or more and 10° or less relative to a virtual plane perpendicular to the central axis.

With this aspect, the inclination of the major cutting edge is 1° or more, and thus chips discharged from the major cutting edge can be sufficiently angled so as to move away from a cutting edge in the right adjacent section. As the angle of the major cutting edge increases, the cutting of the cutting-target material starts at a position increasingly closer to the high cutting side of the major cutting edge. With this aspect, the inclination of the major cutting edge is 10° or less, and thus it is possible to suppress the application of an excessive load to the major cutting edge on the high cutting side.

In the above aspect, the upper surface is six-fold or five-fold symmetrical about the central axis.

With this aspect, a highly cost-efficient cutting insert that has many cutting edges on two surfaces thereof can exhibit excellent effects of the present invention.

With the present invention, it is possible to provide a cutting insert in which cutting edges in a plurality of sections can be used, and it is possible to keep chips discharged from a cutting edge in a section that is being used from damaging an unused cutting edge in an adjacent section.

DETAILED DESCRIPTION

Figure 5:
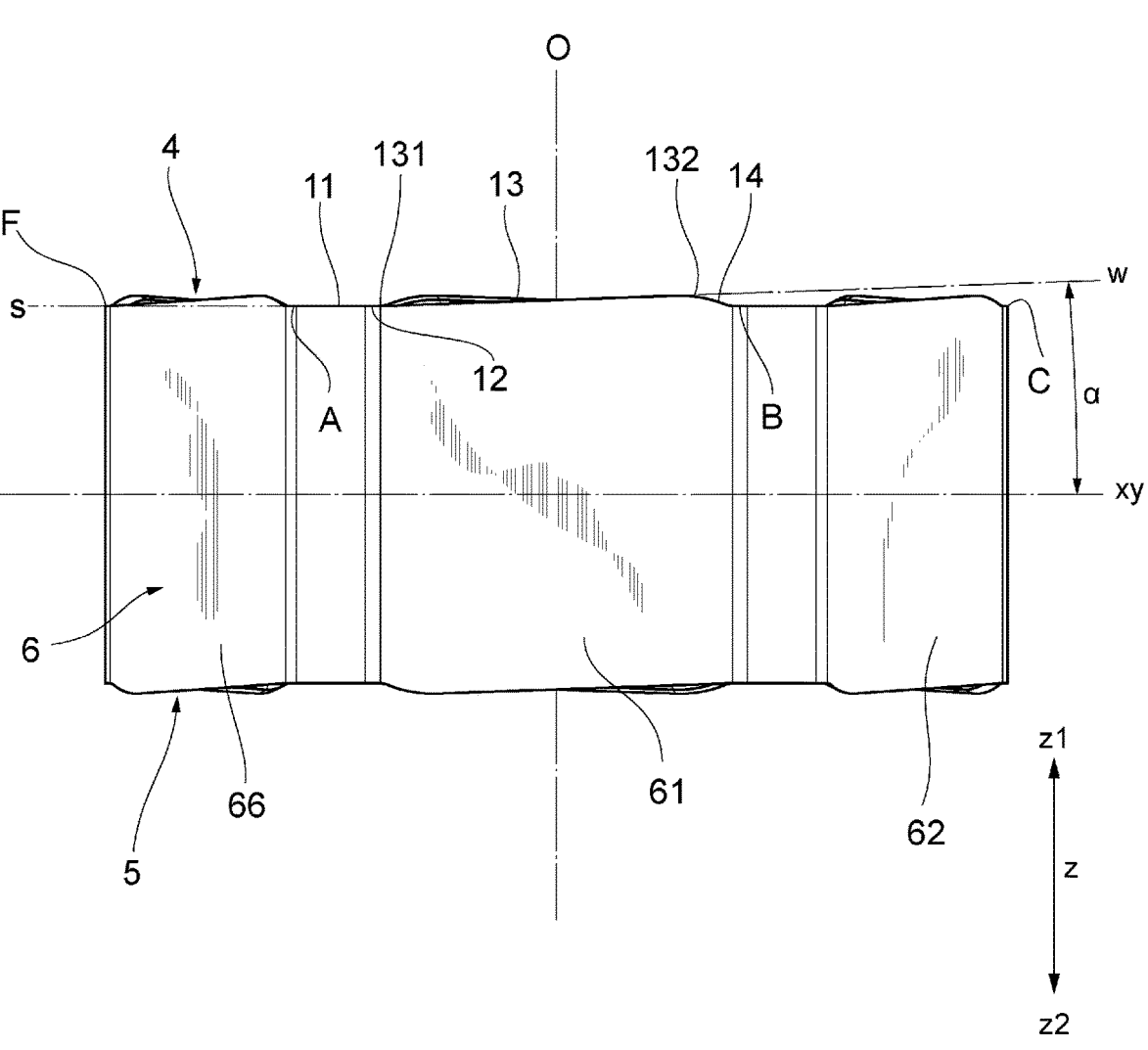
FIG. 5 is a side view of the cutting insert shown in FIG. 4 as seen from a first side surface side.
Figure 10:
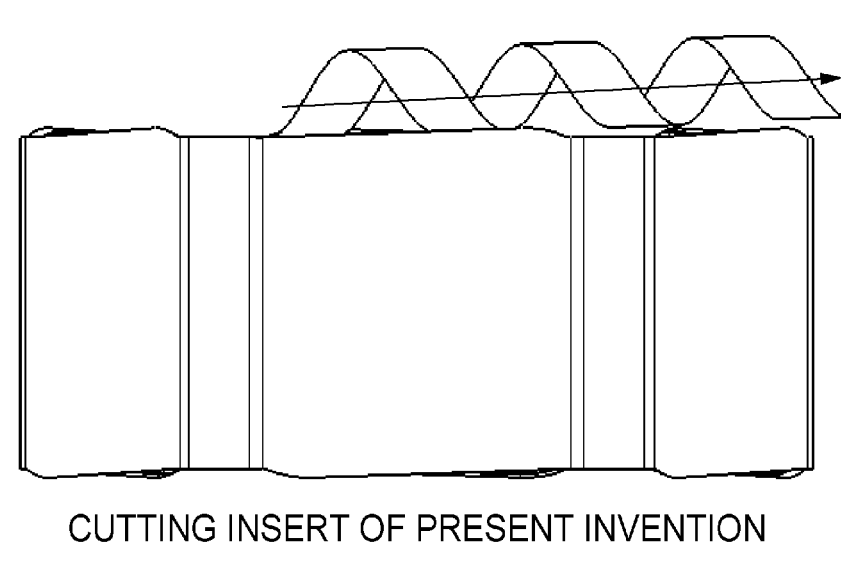
FIG. 10 is a side view comparing a cutting insert of the present invention and a cutting edge of a conventional cutting insert in which chips are discharged from a major cutting edge.
Figure 10:
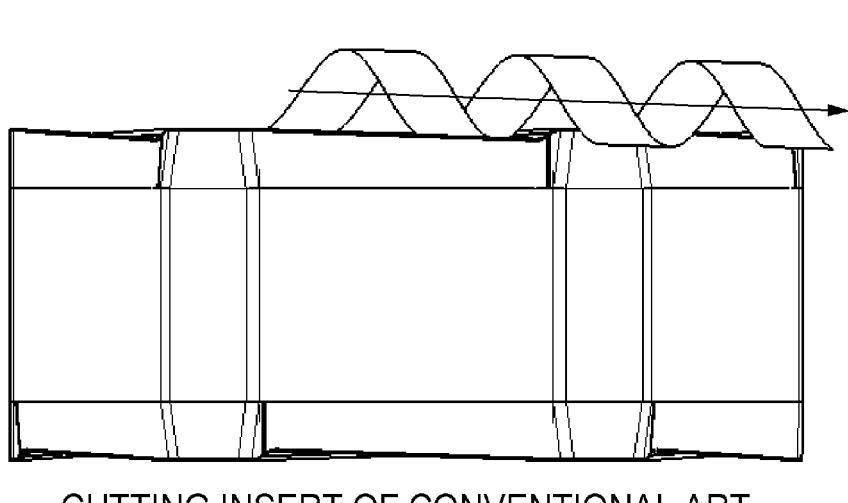

Hereinafter, a preferred embodiment of the present invention will be described with reference to the appended drawings. Note that, in the drawings, structures with the same reference symbols have the same or similar structures. As shown in FIG. 5, a cutting insert 3 according to one embodiment of the present invention is a double-sided cutting insert in which an upper surface 4 and a lower surface 5 have the same shape, and one feature thereof is that a major cutting edge 13 is inclined upward and to the right away from the lower surface 5 while extending from a low cutting side toward a high cutting side. Chips are discharged to the upper right instead of to the lower right, and thus it is possible to suppress damage to a cutting edge in the right adjacent section, as shown in FIG. 10.

Figure 6:
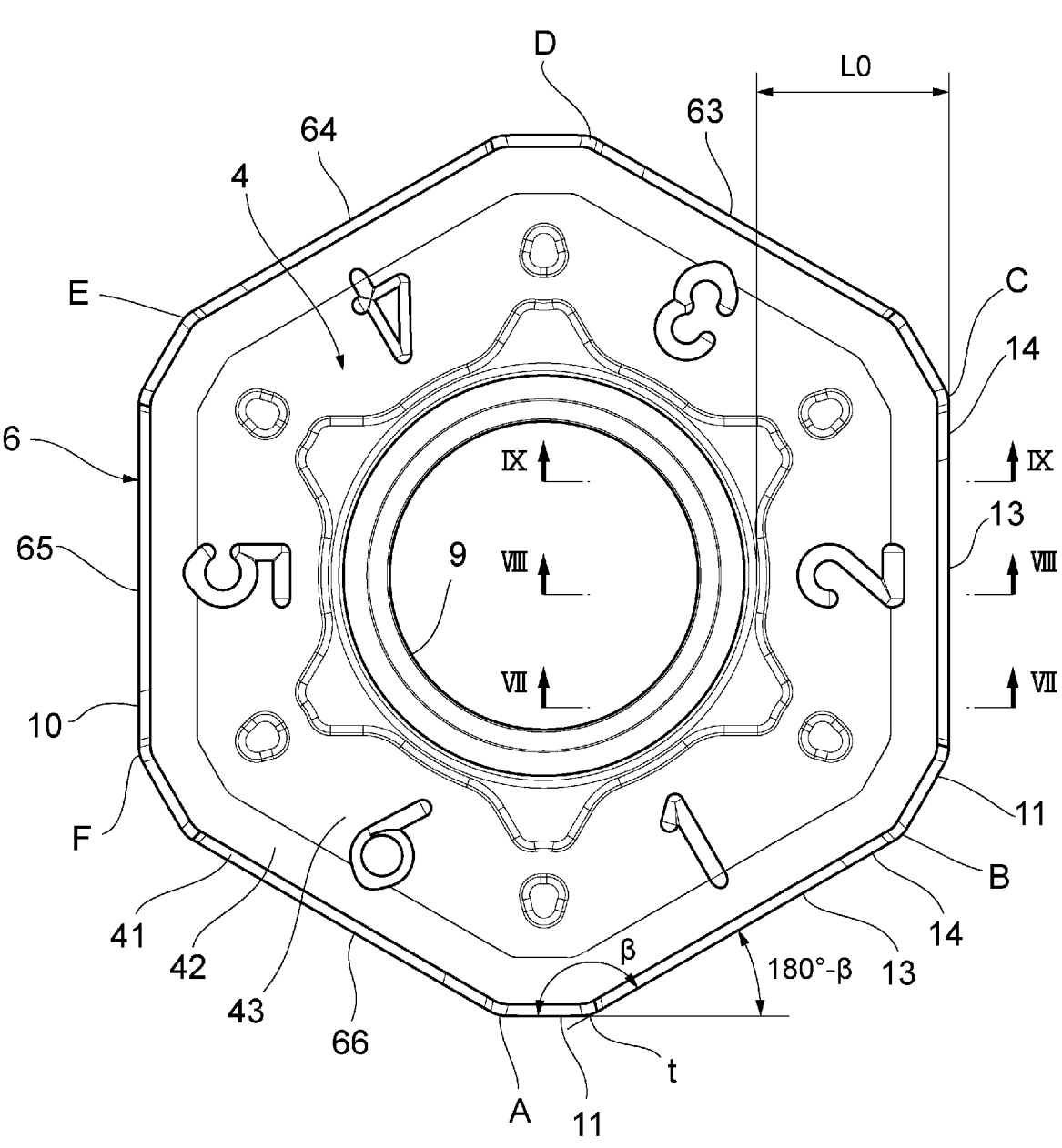
FIG. 6 is a plan view of the cutting insert shown in FIG. 4 as seen from the upper surface side.

When the upper surface 4 and the lower surface 5 are mostly flat, an apparent axial inclination angle j is determined by three elements, namely an inclination angle i (shown in FIG. 2) of the major cutting edge 13 as seen from a direction in which the upper surface 4 of the cutting insert 3 attached to a tool body 2 is approximated by a straight line, a radial rake angle k (shown in FIG. 3), and a cutting angle (180°−β) (shown in FIG. 6). When the major cutting edge 13 of the cutting insert 3 is inclined upward and to the right, the inclination angle i of the major cutting edge 13 is small. In a milling tool 1 to which the cutting insert 3 is attached, balance is achieved by further increasing the radial rake angle k, which is a negative angle, in the negative direction and reducing the cutting angle (180° β) so that the apparent axial inclination angle j is a positive angle.

When the radial rake angle k, which is a negative angle, is further increased in the negative direction, seizing of chips is likely to occur between the upper surface 4 of the cutting insert 3 and the cutting-target material. As shown in FIG. 4 and FIGS. 7 to 9, the upper surface 4 of the cutting insert 3 according to one embodiment of the present invention is not provided with a boss surface or the like that forms a projected part, and thus a sufficient gap can be secured between the upper surface 4 and the cutting-target material. Thus, even if the radial rake angle k is further increased in the negative direction, chips can be easily discharged. Configurations are described in detail below with reference to the drawings.

Figure 1:
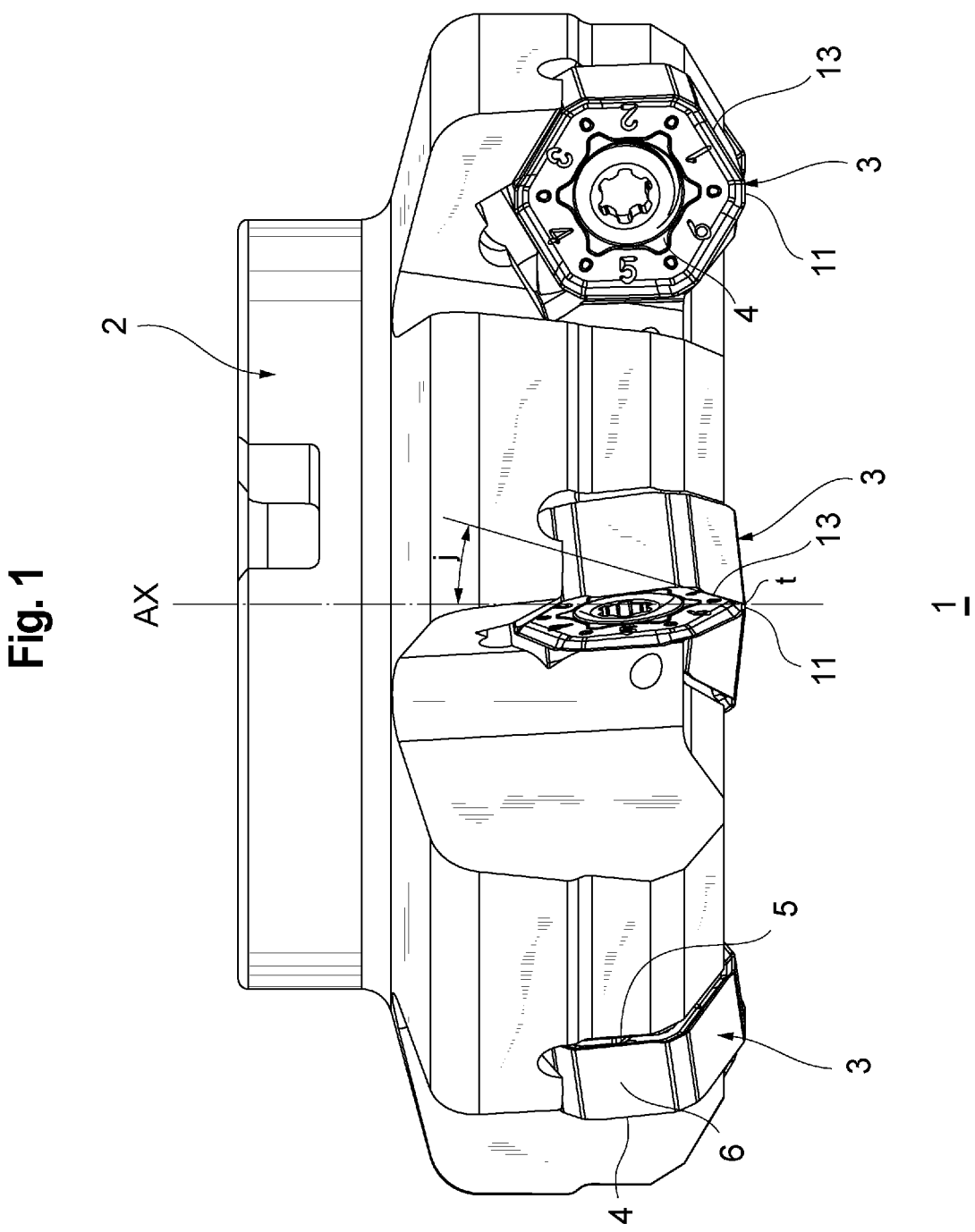
FIG. 1 is a side view of an example of a milling tool to which a cutting insert according to an embodiment of the present invention is attached.
Figure 2:
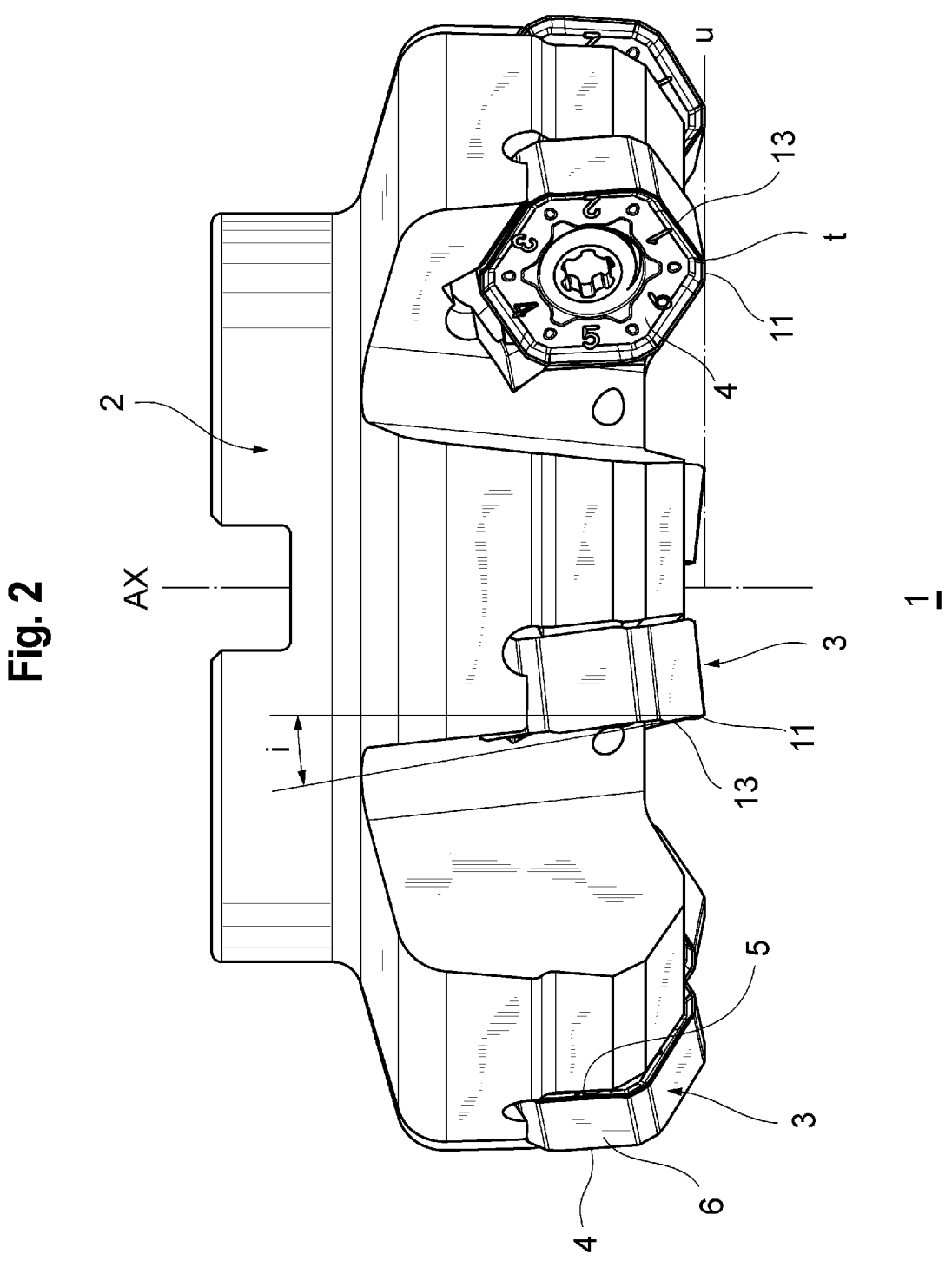
FIG. 2 is a side view of the milling tool shown in FIG. 1 as seen from a direction in which an upper surface is approximated by a straight line.
Figure 3:
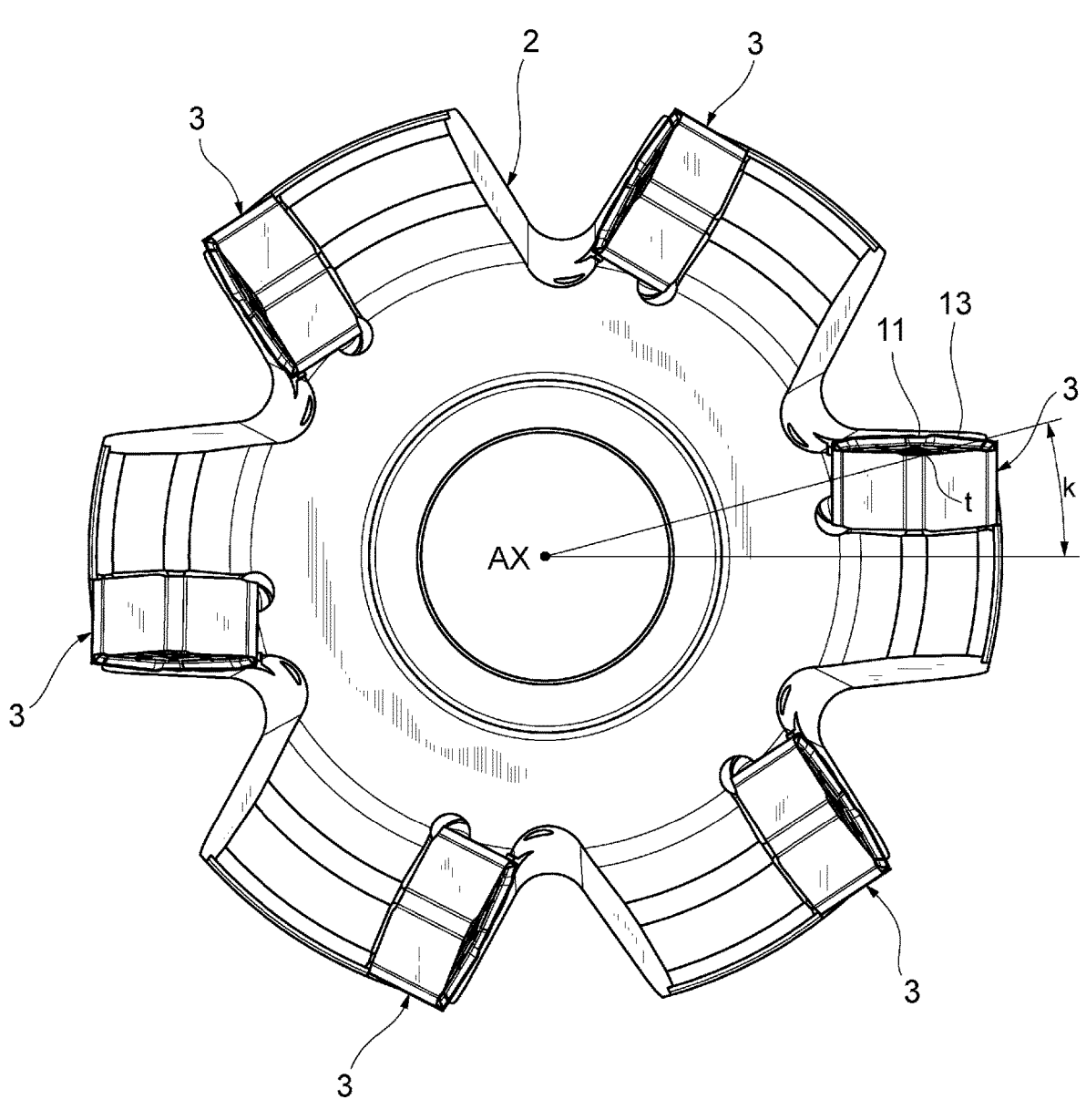
FIG. 3 is a front view of the milling tool shown in FIG. 1 as seen from a minor cutting edge side.

FIGS. 1 and 2 are side views showing an example of the milling tool 1 to which the cutting insert 3 according to one embodiment of the present invention is attached. FIG. 3 is a front view of the milling tool 1 shown in FIG. 1 as seen from a minor cutting edge 11 side. As shown in FIGS. 1 to 3, the milling tool 1 is, for example, a face milling cutter, and is provided with the tool body 2 that has a disk shape, and a plurality of exchangeable cutting inserts 3 that are attached to a peripheral part of the tool body 2.

The definition of the apparent inclination angle j shown in FIG. 1 will be described. A virtual plane that is parallel with the upper surface 4 and intersects all minor cutting edges 11 is s (shown in FIG. 5). A virtual intersection point between a virtual line that is an extension of a minor cutting edge 11 projected onto the virtual plane s and a virtual line that is an extension of a major cutting edge 13 projected onto the virtual plane s is t (shown in FIG. 6). A virtual straight line that extends through the virtual intersection point t and is perpendicular to a rotational axis AX of the milling tool 1 is u (shown in FIG. 2). The apparent axial inclination angle j is an angle j (shown in FIG. 1) formed by the major cutting edge 13 as seen along a virtual straight line u so that the rotational axis AX and the virtual intersection point t overlap, and the rotational axis AX of the milling tool.

The inclination angle i (shown in FIG. 2) of the major cutting edge 13 as seen from a direction in which the upper surface 4 of the cutting insert 3 attached to the tool body 2 is approximated by a straight line is a negative angle of −14° or more and −6° or less. In the example shown in FIG. 2, the inclination angle i is −10°. In the milling tool 1, even when the inclination angle i is small, balance is achieved by increasing the radial rake angle k (shown in FIG. 3), which is a negative angle, further in the negative direction and reducing the cutting angle (180°−β) (shown in FIG. 6) so that the apparent axial inclination angle j is a positive angle. It is preferable that the radial rake angle k is a negative angle of −30° or more and −10° or less. In the example shown in FIG. 3, the radial raking angle k is −15°. It is preferable that the cutting angle (180°−β) is 25° or more and 40° or less. In the example shown in FIG. 6, the cutting angle (180° β) is 30°.

Figure 4:
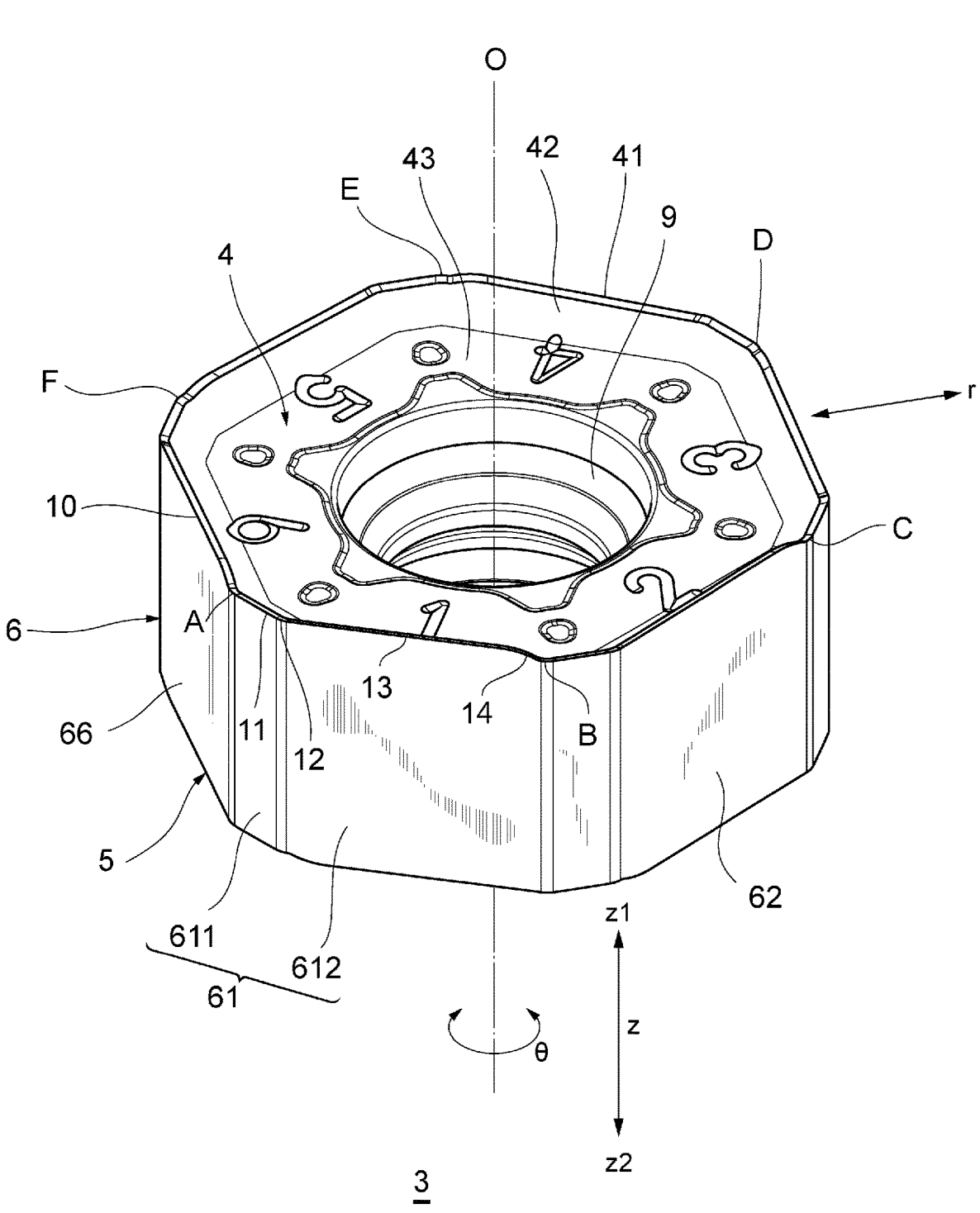
FIG. 4 is a perspective view of an example of the cutting insert according to an embodiment of the present invention.

FIG. 4 is a perspective view of an example of the cutting insert 3 according to an embodiment of the present invention. As shown in FIG. 4, the cutting insert 3 has the upper surface 4, the lower surface 5 on the side opposite to the upper surface 4, a peripheral side surface 6 that connects the upper surface 4 and the lower surface 5 to each other, and an attachment hole 9 that extends through the upper surface 4 and the lower surface 5. The central axis of the attachment hole 9 matches a central axis O of the cutting insert 3 that extends through the center of the upper surface 4 and the center of the lower surface 5.

In the following description, a direction that is parallel to the axial direction of the central axis O is referred to as an up-down direction z. The upper surface 4 and the lower surface 5 oppose each other in the up-down direction z. The upper surface 4 side as seen from the lower surface 5 is referred to as an upper side z1, and the lower surface 5 side as seen from the upper surface 4 is referred to as a lower side z2. Furthermore, a direction that is perpendicular to the central axis O is referred to as a radial direction r of the cutting insert 3, and a direction extending along a circumference centered around the central axis O is referred to as a circumferential direction θ of the cutting insert 3.

The cutting insert 3 is a double-sided cutting insert that can be used with the upper surface 4 and the lower surface 5 inverted, and the lower surface 5 has substantially the same shape as the upper surface 4. In the milling tool 1, the cutting insert 3 may be attached to the tool body 2 such that the lower surface 5 is fixed, and the cutting insert 3 may be attached to the tool body 2 such that the upper surface 4 is fixed. Thus, the upper surface 4 will be described in detail as a representative example while redundant description of the lower surface 5 will be omitted.

The upper surface 4 is rotationally symmetrical around the central axis O. Preferably, the upper surface 4 is six- or five-fold symmetrical. The contour of the upper surface 4 has a substantially polygonal shape that includes a plurality of first corners A, B, C, and so on. In the example shown in FIG. 6, the upper surface 4 is six-fold symmetrical (60° symmetrical) about the central axis O, and has a substantially regular hexagonal shape (see FIG. 6). The cutting insert 3 has many cutting edges 11 to 13 on two surfaces thereof, and is thus highly cost-efficient.

An edge 10 where the upper surface 4 and the peripheral side surface 6 intersect is divided into sections (sides of a polygon) AB, BC, CD, and so on that respectively correspond to the first corners A, B, C, and so on. Each of the sections AB, BC, CD, and so on are provided with one minor cutting edge 11, one corner cutting edge 12, and one major cutting edge 13. It may also be said that each of the sections AB, BC, CD, and so on include a set of the cutting edges 11 to 13, where the set of cutting edges 11 to 13 includes one of each of the minor cutting edge 11, the corner cutting edge 12, and the major cutting edge 13.

More specifically, the section AB includes the minor cutting edge 11 formed adjacent to the first corner A corresponding to the section AB, the corner cutting edge 12 formed adjacent to the minor cutting edge 11 from the side opposite to the corresponding first corner A, and the major cutting edge 13 that is formed adjacent to the corner cutting edge 12 and extends toward another first corner B adjacent to the first corner A. The section AB may also include a linking portion 14 that is adjacent to the major cutting edge 13 from the side opposite to the minor cutting edge 11, that is from the high cutting side, and links the major cutting edge 13 and the right adjacent first corner B.

The major cutting edge 13 is the longest of the cutting edges 11, 12, and 13, and is longer than the minor cutting edge 11 and the corner cutting edge 12. The corner cutting edge 12 is curved in an arc-shape as seen from the upper surface 4 side. The minor cutting edge 11 is located on the side opposite to the major cutting edge 13 across the corner cutting edge 12. The minor cutting edge 11 is a cutting edge for reducing the roughness of a machining bottom surface, and is also called a wiper edge. In a state where the cutting insert 3 is attached to the tool body 2, the minor cutting edge 11 is disposed in an orientation that is substantially perpendicular to the rotational axis AX of the milling tool 1. In a state where the cutting insert 3 is attached to the tool body 2, the major cutting edge 13 is disposed farther on the outer side from the central axis AX of the milling tool 1 than the minor cutting edge 11.

In the following description, "the first corners A, B, C, and so on" may simply be referred to as "the corners A, B, C, and so on". The "corner cutting edge 12" may be referred to as a "second corner 12". The "other first corner" adjacent to the "first corner corresponding to a section" may be referred to as the "right adjacent first corner". The "first corner corresponding to a section" may be referred to as the "start point" of the section, and the "other first corner" adjacent to the "corresponding first corner" may be referred to as the "end point" of the section.

Similarly to the section AB, each of the sections BC, CD, DE, and so on include the minor cutting edge 11 formed adjacent to the first corners B, C, D, and so on corresponding to the sections BC, CD, DE, and so on, the corner cutting edge 12 formed adjacent to the minor cutting edge 11 from the side opposite to the corresponding first corners B, C, D, and so on, the major cutting edge 13 formed adjacent to the corner cutting edge 12 and extending toward the right adjacent first corners C, D, F, and so on, and the linking portion 14 between the right end of the major cutting edge 13 and the right adjacent first corners C, D, F, and so on. The minor cutting edge 11, the corner cutting edge 12, the major cutting edge 13, and the linking portion 14 provided in each of the sections AB, BC, CD, and so on are arranged in this order in the circumferential direction θ of the cutting insert 3.

The upper surface 4 includes a flat surface 43 that is parallel to a virtual plane xy (see FIG. 5) that is perpendicular to the central axis O of the cutting insert 3, a rake surface 42 provided on the outer periphery of the flat surface 43, and a land 41 provided between the rake surface and the major cutting edges. The land 41 may also be called a first rake surface, and the rake surface 42 may also be called a second rake surface. The virtual plane xy may be called a virtual horizontal plane.

The peripheral side surface 6 that connects the upper surface 4 and the lower surface 5 is formed parallel with the central axis O of the cutting insert 3. Specifically, the cutting insert 3 is a negative cutting insert in which the clearance angle of the minor cutting edge 11 and the major cutting edge 13 is 0°. The peripheral side surface 6 is divided into side surfaces 61, 62, 63, and so on that respectively correspond to the sections AB, BC, CD, and so on. In the shown example, the peripheral side surface 6 is divided into the first to sixth side surfaces 61 to 66.

Each side surface (for example, the first side surface 61) includes a flank 611 that is part of the minor cutting edge 11 and faces the minor cutting edge 11, and a flank 612 that is part of the major cutting edge 13 and faces the major cutting edge 13. In the circumferential direction θ of the cutting insert 3, the flanks 611 of the minor cutting edges 11 and the flanks 612 of the major cutting edges 13 are alternately arranged. In the example shown in FIG. 6, the flanks 611 and 612 are flat surfaces and not curved surfaces. The linking portions 14 may be located on the same plane as the flanks 612 of the major cutting edges 13 or on a different plane.

FIG. 5 is a side view of the cutting insert shown in FIG. 4 as seen from the first side surface 61 side. As shown in FIG. 5, in each section (for example, section AB), the major cutting edge 13 provided in the section is inclined upward and to the right away from the lower surface 5 while extending away from the minor cutting edge 11 provided in the section. In the up-down direction z, a point on the major cutting edge 13 that is closest to the lower surface 5 is a lowest point 131, and a point on the major cutting edge 13 that is farthest from the lower surface 5 is a highest point 132.

The angle with which a virtual straight line w extending through the lowest point 131 and the highest point 132 is inclined relative to a virtual plane xy that is perpendicular to the central axis O is a. The angle α is preferably 1° or more and 10° or less. When the angle α is 1° or more, chips discharged from the major cutting edge 13 can be sufficiently angled so as to move away from the right adjacent first corner (the first corner B in the example shown in FIG. 5). When the angle α is 10° or less, it is possible to suppress the application of an excessive load to the major cutting edge 13 on the high cutting side distanced from the minor cutting edge 11.

FIG. 6 is a plan view of the cutting insert 3 shown in FIG. 4 as seen from the upper surface 4 side along the central axis O. In the example shown in FIG. 6, the minor cutting edges 11 and the major cutting edges 13 are formed so as to be linear in a plan view. It is preferable that the angle (interior angle) β formed by a minor cutting edge 11 and a major cutting edge 13 is 140° or more and 155° or less. Because the cutting angle (180°−β) is 25° or more and 40° or less, which is smaller than a common angle of 45°, balance can be achieved such that the apparent axial inclination angle j is a positive angle, even if the major cutting edge 13 is inclined upward and to the right in a side view.

Figure 7:
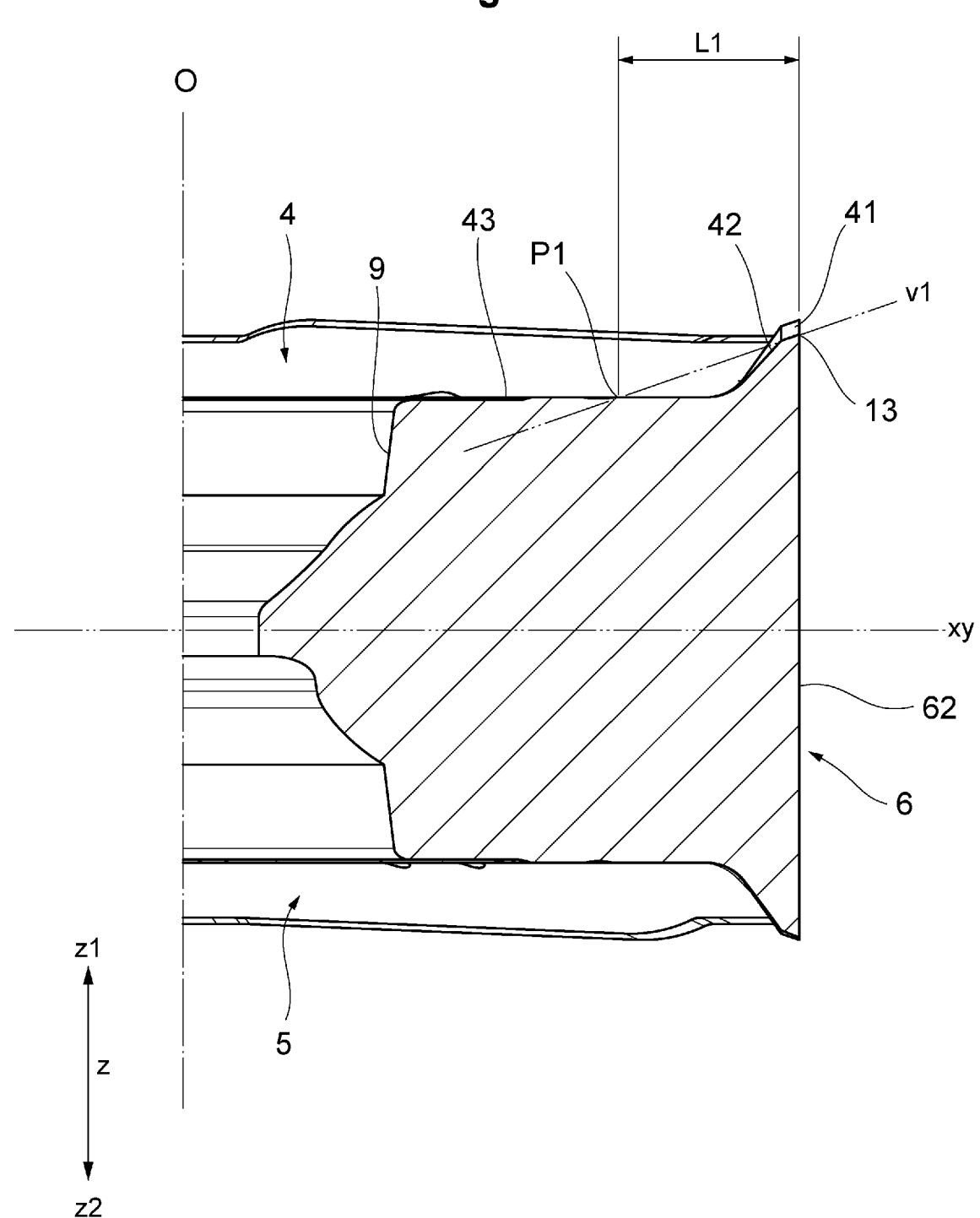
FIG. 7 is a cross-sectional view of a low cutting side taken along line VII-VII in FIG. 6.
Figure 8:
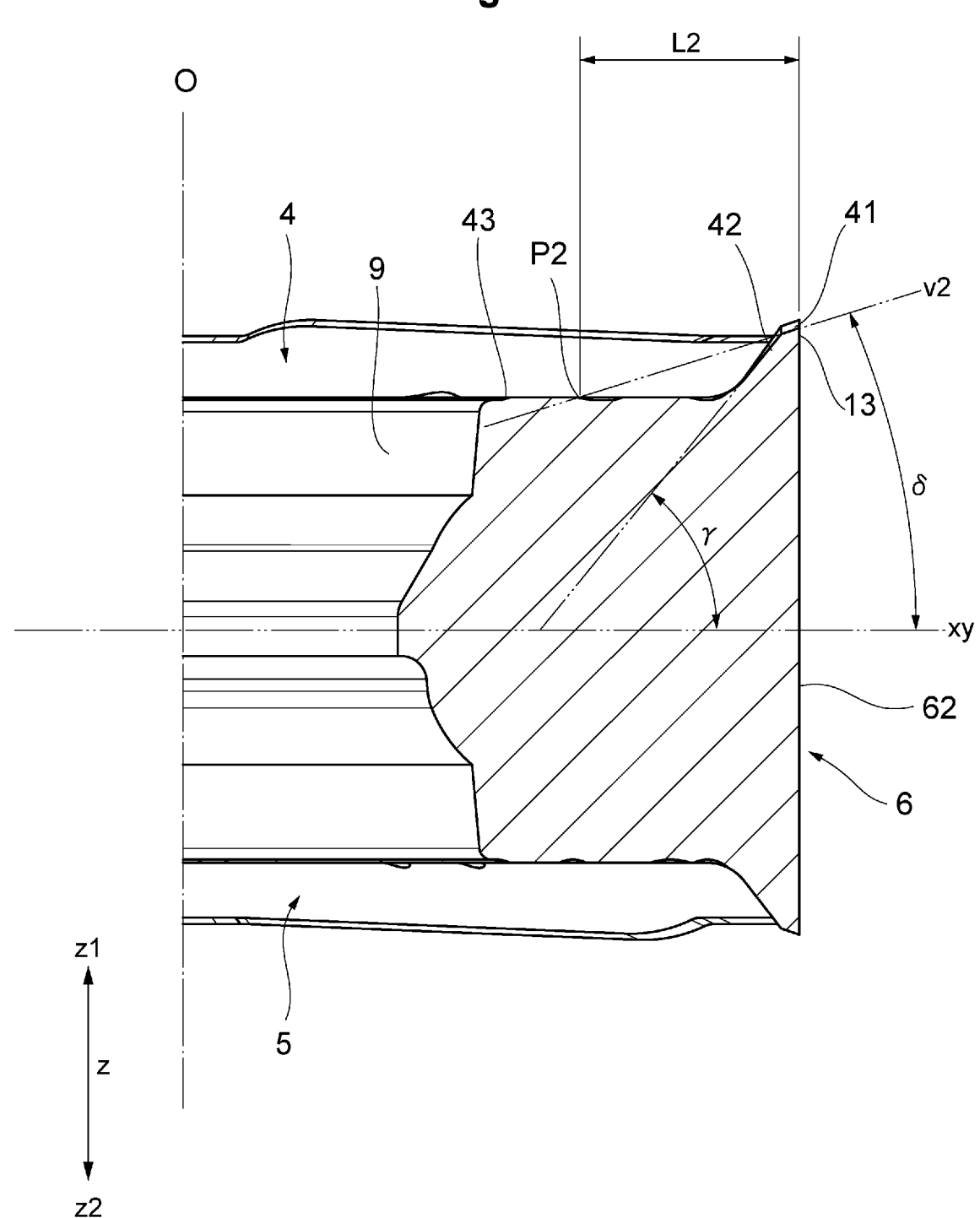
FIG. 8 is a cross-sectional view of the center of the major cutting edge taken along line VIII-VIII in FIG. 6.
Figure 9:
FIG. 9 is a cross-sectional view of a high cutting side taken along line IX-IX in FIG. 6.

FIGS. 7 to 9 are cross-sectional views taken along lines VII-VII, VIII-VIII, and IX-IX shown in FIG. 6, respectively. More specifically, FIG. 8 is a cross-sectional view of the cutting insert 3 taken perpendicular to the major cutting edge 13 at the central position of the major cutting edge 13 that is at the same distance from the minor cutting edge 11 and the linking portion 14. FIG. 7 is a cross-sectional view of the cutting insert 3 taken perpendicular to the major cutting edge 13 at a position on the low cutting side that is close to the minor cutting edge 11 relative to the center. FIG. 9 is a cross-sectional view of the cutting insert 3 taken perpendicular to the major cutting edge 13 at a position on the high cutting side that is far from the minor cutting edge 11 relative to the center.

As shown in FIGS. 7 to 9, the cross-section of the land 41 is formed such that the contour thereof is linear. Similarly, the cross-section of the rake surface 42 is formed such that the contour thereof is linear. As shown in FIG. 7, the rake surface 42 is inclined at a first angle θ1 relative to the virtual plane xy that is perpendicular to the central axis O. The land 41 is inclined at a second angle 82, which is smaller than the first angle θ1, relative to the virtual plane xy.

As shown in FIGS. 5 and 8, as the upper surface 4 extends from the major cutting edges 13 toward the attachment hole 9, the height position of the upper surface 4 continues to decrease at the land 41 and the rake surface 42 from the upper surface 4 toward the lower surface 5, and does not change in the up-down direction z on the flat surface 43. In other words, even if there is a decrease in the height position, the height position of the upper surface 4 does not increase as the upper surface 4 extends toward the central axis O along the radial direction r of the cutting insert 3. The height of the upper surface 4 decreases toward the center.

Note that the flat surface 43 in the present invention is not limited to being a flat surface in a strict sense, and may have minor protrusions/recessions as long as the ability to discharge chips is not affected. In the example shown in FIG. 6, Arabic numerals 1 to 6 and round marks separating adjacent numerals are engraved on the flat surface 43. For example, a configuration may be employed where the height of the upper surface 4 in the up-down direction z slightly decreases upon entering an engraved character, which is a minute recessed part, and the height of the upper surface 4 slightly increases in the up-down direction z by an amount corresponding to the decrease in height upon exiting the engraved character. Such an aspect does not affect the gist of the invention, and is naturally encompassed within the scope of the present invention.

The height position of the upper surface 4 will be described in further detail. As shown in FIGS. 7 to 9, virtual intersection points where virtual lines v1, v2, v3, and so on, which are extensions of the contour of the land 41, intersect the flat surface 43 are respectively P1, P2, P3, and so on, and in the cross-sectional views, the distance from the virtual intersection points P1, P2, P3, and so on to the major cutting edge 13 are respectively lengths L1, L2, L3, and so on, the lengths L1, L2, L3, and so on being measured in directions perpendicular to the central axis O, that is, directions that respectively extend along the VII-VII line, the VIII-VIII line, and the IX-IX line in FIG. 6 and are perpendicular to the central axis O.

The position of the major cutting edge 13 gradually increases in height from the low cutting side (see FIG. 7), the central portion (see FIG. 8), and the high cutting side (see FIG. 9), in this order, away from the flat surface 43. Thus, in the FIGS. 7 to 9, the relation L1<L2<L3 is satisfied. The lengths L1, L2, L3 and so on are variables that change depending on the position at which the cross-section is taken.

The variables L1, L2, and L3, and so on have the property of decreasing when there is a protrusion on the upper surface 4. When a shortest distance LO from each of the major cutting edges 13 to the outer edge of the attachment hole 9 in a plan view shown in FIG. 6 is set as the reference value, the protrusions of the upper surface 4 of the cutting insert 3 have a small shape, and thus all of the variables L1, L2, L3, and so on are larger than half of the reference value LO. In the shown examples, (L1>LO×0.5), (L2>LO×0.5), and (L3>LO×0.5).

In the cutting insert 3 according to an embodiment of the present invention configured as described above, as described with reference to FIG. 5, the major cutting edge 13 is inclined upward and to the right away from the lower surface 5 while extending from the low cutting side toward the high cutting side. As shown in FIG. 10, in a conventional cutting insert, the major cutting edge is inclined downward and to the right, and thus chips discharged downward and to the right may damage a cutting edge in an adjacent section. In contrast to this, the cutting insert 3 of the present invention discharges chips upward and to the right, and thus, even if a cutting edge in the adjacent section is unused, it is possible to keep a cutting edge in the section from being damaged.

Furthermore, as described with reference to FIG. 5 and FIGS. 7 to 9, this cutting insert 3 has small protrusions on the upper surface 4, and thus it is easy to secure a gap between the upper surface 4 and the cutting-target material. Chips are unlikely to seize between the upper surface 4 and the cutting-target material, and thus the radial rake k, which is a negative angle, can be further increased in a negative direction. The angle β between the minor cutting edge 11 and the major cutting edge 13 is 140° or more and 155° or less, and thus, in the milling tool 1 to which the cutting insert 3 is attached, the cutting angle (180°−β) is 25° or more and 40° or less, which is smaller than a common angle of 45°.

As described with reference to FIGS. 2 and 5, when the major cutting edge 13 is inclined upward and to the right, the inclination angle i of the major cutting edge 13 as seen from the side surface of the milling tool 1 is reduced, but with this cutting insert 3, balance can be achieved by further increasing the radial rake angle k, which is a negative angle, in the negative direction and reducing the cutting angle (180°−β)

so that the apparent axial inclination angle j in FIG. 1 is a positive angle. The cutting insert 3 that has many cutting edges on two surfaces thereof and is highly cost-efficient adopts the major cutting edge 13 that is inclined upward and to the right, and thus it is possible to keep chips discharged from the major cutting edge 13 and the like in a section that is being used (for example, section AB) from damaging the cutting edges 11 to 13 in an adjacent unused section (for example, section BC).

The above described embodiments are to facilitate comprehension of the present invention and are not to be interpreted as limiting the present invention. The elements constituting the embodiments and their placement, materials, conditions, shapes, sizes, and the like are not limited to that illustrated, and can be modified as necessary. Also, configurations illustrated in different embodiments can be partially replaced or combined with each other. For example, the present invention may be applied to a cutting insert used in a milling tool 1 whose rotation direction is reversed. In this case, the other first corner adjacent to a corresponding first corner is a left adjacent first of the corresponding first corner instead of the right adjacent corner.

What is claimed is:

1. A cutting insert comprising:

an upper surface;

a lower surface on an opposite side to the upper surface;

a peripheral side surface that connects the upper surface and the lower surface to each other; and an attachment hole that extends through the upper surface and the lower surface, wherein the upper surface is rotationally symmetrical about a central axis extending through a center of the upper surface and a center of the lower surface, and the lower surface has substantially the same shape as the upper surface, an edge where the upper surface and the peripheral side surface intersect is divided into a plurality of adjacent sections, and each of the sections includes one minor cutting edge and one major cutting edge that is longer than the minor cutting edge, in each section, the minor cutting edge and the major cutting edge are arranged in a same order counterclockwise from one of the sections to an adjacent one of the sections in a circumferential direction along a circumference centered on the central axis, each of the major cutting edges is inclined upward in a right-hand direction extending away from the lower surface gradually while extending away from the minor cutting edge, and as the upper surface extends from each of the major cutting edges toward the attachment hole, a height position of the upper surface in an up-down direction, in which the upper surface and the lower surface oppose each other, does not change, or the height position decreases in a direction from the upper surface toward the lower surface.

2. The cutting insert according to claim 1, wherein, in a plan view as seen from the upper surface, an angle formed by the minor cutting edge and the major cutting edge is 140° or more and 155° or less.

3. The cutting insert according to claim 2, wherein, for each of the major cutting edges, a virtual straight line extending in the up-down direction in which the upper surface and the lower surface oppose each other, through a lowest point, which is a point on the major cutting edge that is closest to the lower surface, and a highest point, which is a point on the major cutting edge that is farthest from the lower surface, is inclined at an angle of 1° or more and 10° or less relative to a virtual plane perpendicular to the central axis.

4. The cutting insert according to claim 3, wherein the upper surface is six-fold or five-fold symmetrical about the central axis.

5. A cutting insert comprising:

an upper surface;

a lower surface on an opposite side to the upper surface;

a peripheral side surface that connects the upper surface and the lower surface to each other; and an attachment hole that extends through the upper surface and the lower surface, wherein the upper surface is rotationally symmetrical about a central axis that extends through a center of the upper surface and a center of the lower surface, and the lower surface has substantially the same shape as the upper surface, an edge where the upper surface and the peripheral side surface intersect is divided into a plurality of adjacent sections, and each of the sections includes one minor cutting edge and one major cutting edge that is longer than the minor cutting edge, in each section, the minor cutting edge and the major cutting edge are arranged in a same order counterclockwise from one of the sections to an adjacent one of the sections in a circumferential direction along a circumference centered on the central axis, each of the major cutting edges is inclined upward in a right-hand direction extending to be away from the lower surface gradually while extending away from the minor cutting edge, and each of the major cutting edges is inclined to be away from the lower surface gradually while extending away from the minor cutting edge, the upper surface includes a flat surface parallel to a virtual plane perpendicular to a central axis extending through the center of the upper surface and the center of the lower surface, a rake surface that is provided on a periphery of the flat surface and is inclined at a first angle relative to the virtual plane, and a land having a linear contour in cross-section that is provided between the rake surface and each of the major cutting edges and is inclined at a second angle relative to the virtual plane, the second angle being smaller than the first angle, and for each of the major cutting edges, when in a plan view as seen along the central axis, a shortest linear distance from the major cutting edge to an outer edge of the attachment hole is taken as a reference value, and when in a cross-section taken perpendicular to the major cutting edge at a position along the major cutting edge, a length measured, along a direction perpendicular to the central axis, from a virtual intersection point where a virtual straight line that is an extension of the linear contour of the land intersects the flat surface to the major cutting edge, is taken as a variable which changes depending on the position at which the cross-section is taken, all of the variables are larger than half of the reference value.

6. The cutting insert according to claim 5, wherein, in a plan view as seen from the upper surface, an angle formed by the minor cutting edge and the major cutting edge is 140° or more and 155° or less.

7. The cutting insert according to claim 6, wherein, for each of the major cutting edges, a virtual straight line extending in the up-down direction in which the upper surface and the lower surface oppose each other, through a lowest point, which is a point on the major cutting edge that is closest to the lower surface, and a highest point, which is a point on the major cutting edge that is farthest from the lower surface, is inclined at an angle of 1° or more and 10° or less relative to a virtual plane perpendicular to the central axis.

8. The cutting insert according to claim 7, wherein the upper surface is six-fold or five-fold symmetrical about the central axis.

\* \* \* \* \*